Aug. 14, 1956 W. W. WHITE ET AL 2,759,098

PRINTED CIRCUIT BAND SWITCHING TELEVISION TUNER

Filed Dec. 13, 1951 8 Sheets-Sheet 1

INVENTORS
WARREN WHITMORE WHITE
THOMAS LEE FISCHER

BY Ostrolenk & Faber

ATTORNEYS

INVENTORS
WARREN WHITMORE WHITE
THOMAS LEE FISCHER
BY
Ostrolenk & Faber
ATTORNEYS

PRINTED CIRCUIT BAND SWITCHING TELEVISION TUNER

Inventors
WARREN WHITMORE WHITE
THOMAS LEE FISCHER

By Ostrolenk & Faber

Attorneys

INVENTORS
Warren Whitmore White
Thomas Lee Fischer
BY Ostrolenk & Faber
ATTORNEYS INVENTORS
WARREN WHITMORE WHITE
THOMAS LEE FISCHER
BY
Ostrolenk & Faber
ATTORNEYS INVENTORS
WARREN WHITMORE WHITE
THOMAS LEE FISHER
BY
Ostrolenk & Faber
ATTORNEYS

PRINTED CIRCUIT BAND SWITCHING TELEVISION TUNER

Filed Dec. 13, 1951 8 Sheets-Sheet 7

INVENTORS
WARREN WHITMORE WHITE
THOMAS LEE FISCHER
BY
Ostrolenk & Faber
ATTORNEYS Aug. 14, 1956 W. W. WHITE ET AL 2,759,098

PRINTED CIRCUIT BAND SWITCHING TELEVISION TUNER

Filed Dec. 13, 1951 8 Sheets-Sheet 8

INVENTORS
Warren Whitmore White
Thomas Lee Fischer
BY
Ostrolenk & Faber
ATTORNEYS United States Patent Office 2,759,098

Patented Aug. 14, 1956

2,759,098

PRINTED CIRCUIT BAND SWITCHING TELEVISION TUNER

Warren Whitmore White, Altadena, and Thomas Lee Fischer, South Gate, Calif., assignors to Standard Coil Products Co. Inc., Los Angeles, Calif., a corporation of Illinois Application December 13, 1951, Serial No. 261,398

3 Claims. (Cl. 250—20)

The present invention relates to television tuners and more particularly to a television tuner utilizing printed circuit components.

Circuits are defined as being "printed" when they are produced on an insulated surface by any process. The methods of printing circuits may fall into the following classifications: painting, spraying, chemical deposition, vacuum process, die stamping, dusting, etching, or by photographic means.

In frequency selectors of the television tuner type, it is presently the practice to tune inductively by providing a plurality of variable inductors. The tuner is operated by means of a rotatable shaft to successively move predetermined amounts of inductances into engagement with fixed contact elements in order to tune the unit to predetermined television channels. In addition, a fine or vernier tuning arrangement is also provided. Such an arrangement is generally shown in copending applications Serial Nos. 218,162 and 226,718, filed March 29, 1951 and May 16, 1951, now Patents 2,650,298 and 2,658,394, respectively.

The problems arising in television tuners where the tuning range is approximately 172 megacycles, from a low end of 54 megacycles to a high end of 216 megacycles are appreciable with regard to obtaining a good frequency response. The positioning of the various components and associated structure is critical with regard to the response as well as the space savings involved.

These difficulties are overcome in the present invention by a novel compact tuning assembly which may utilize a cascode circuit, having a simple driving mechanism, a printed base and printed coils, with proper coupling between stages.

It is then an important object of the present invention, to provide a novel tuning unit utilizing printed components.

Another important object of the present invention is the provision of a novel tuner utilizing printed coils for channel selection.

Still another important object of the present invention is to provide a novel tuner having a flat frequency response over the television frequency range.

Still another important object of the present invention is the provision of a compact fine tuner capable of being mass produced.

Still another object of the present invention is the provision of a novel tuner where the coupling between stages is accomplished by electrically coupling the printed coils and printed base.

The novel features that are considered characteristic of this invention are set forth in the appended claims. The invention, however, both as to its organization and method of operation, as well as additional objects and advantages thereof, will best be understood from the following description when read in conjunction with the drawings, in which:

Figure 1:
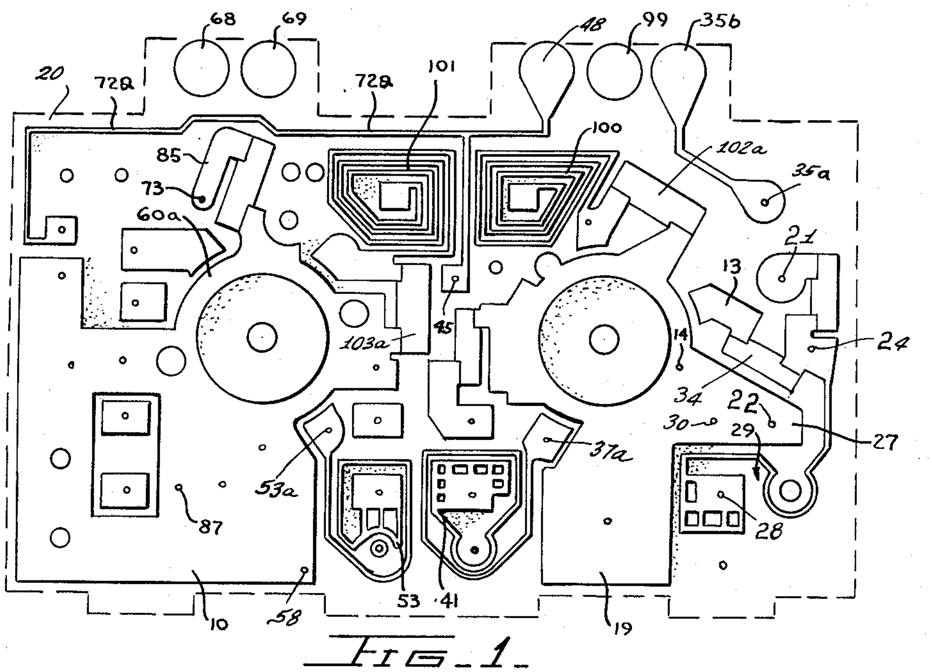
Figure 1 is a top view of the printed base of a tuner embodying the present invention.
Figure 2:
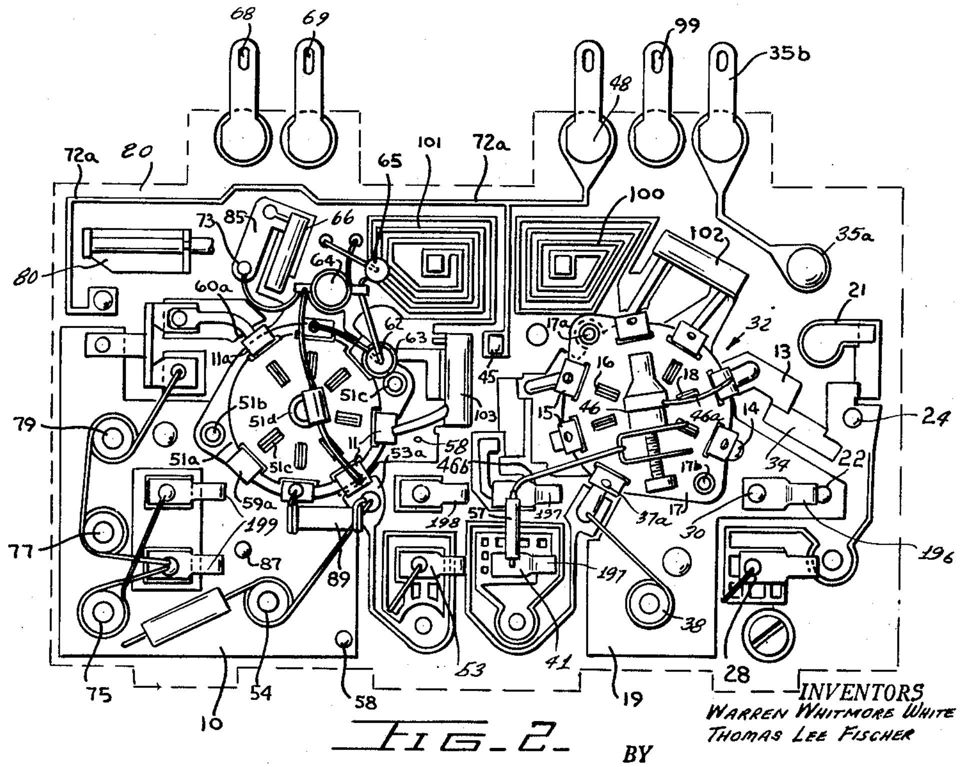
Figure 2 is a top view of the assembled circuit components of the novel tuner.
Figure 3:
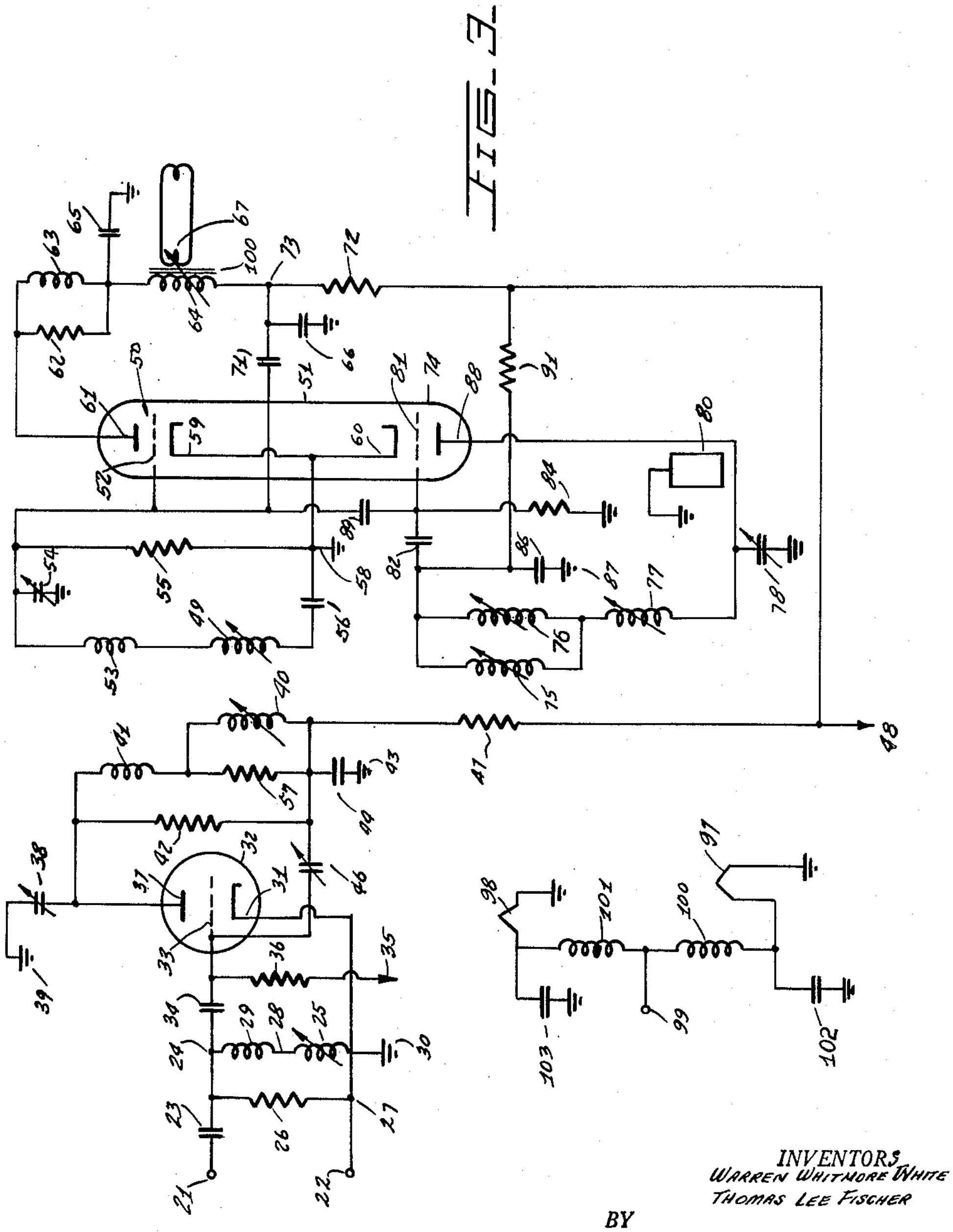
Figure 3 is a schematic drawing of the circuit of the tuner of the invention.
Figure 17:
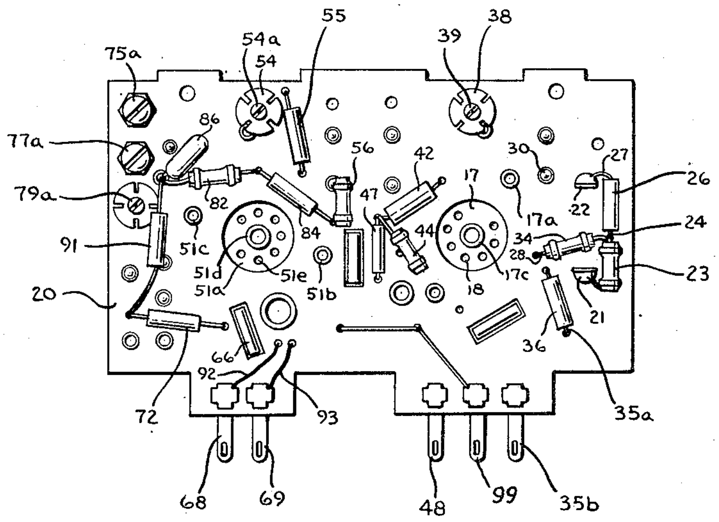
Figure 17 is a bottom view of the printed base.
Figure 14:
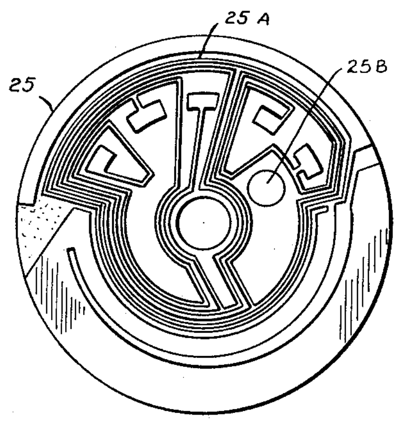
Figure 14 is a top view of a printed tuning inductor of the present invention.
Figure 18:
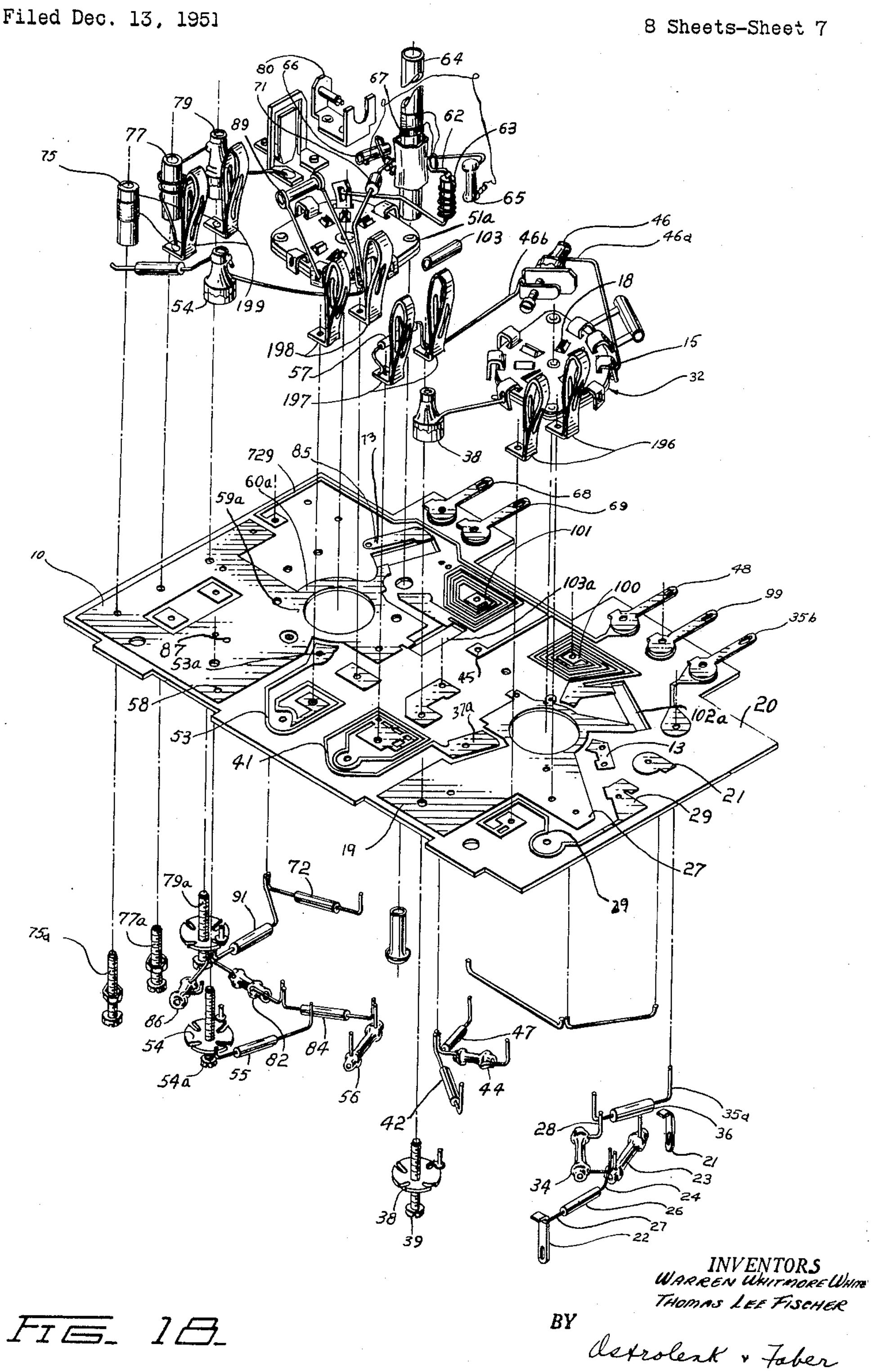
Figure 18 is an exploded view of the printed base and the components mounted thereon.

Referring now to Figures 1, 2, 3, 17 and 18, the terminals 21 and 22 are the input terminals to the printed base 20. Figure 17, which is the bottom view of the printed base 20, and Figure 18, show the physical point of connection to the terminals 21 and 22 whereas Figures 3, 1 and 2 show the electrical equivalent in the circuit and as a printed portion on the top of the printed base 20. The input terminal 21 is connected through an impedance transformation capacitor 23 (Figures 3, 17 and 18) to the terminal 24. One of the electrodes of the capacitor 23 is connected to the terminal 21 and the other to the terminal 24. The capacitor 23 essentially transforms the input impedance of 300 ohms to an approximate impedance of 1000 ohms. This higher input impedance allows the antenna tuning inductor 25 (Figures 3, 11, 14 and 19) hereinafter described, to operate with proper loading.

The terminal 24 is connected through a loading resistor 26 (Figures 3, 17 and 18) to the terminal 27 which is electrically the same as terminal 22.

The loading resistor 26 has comparatively large resistance and so effectively maintains the impedance of the circuitry associated with the inductor 25 fairly constant over the complete television band width. The terminal 24 is also connected to terminal 28 through an inductor 29 which is a lumped printed inductance on the printed base 20, shown specifically in Figure 1.

The inductor 29 allows tuning to the frequency of channel 13 with a minimum of inductance on the coil board inductor or antenna tuning inductor 25. The inductor 29 may be a variable inductor to compensate for variations in the manufacture of the inductor coil board 25. The inductor 25 is connected between the terminals 28 and 30, described above; the terminal 30 being at ground potential as indicated at Figure 3.

The terminals 30, 27 and 22, as shown specifically in Figure 1, are all points on the large metallic surface 19, hereinafter described, which is at ground potential. The inductor 25 is positioned as is also hereinafter described in a plane that is perpendicular to the base 20 and makes contact with two leaf springs 196 which are riveted to the base 20 at terminals 28 and 30 described above and shown in Figures 2, 11 and 19.

The surface 19 containing the terminals 22, 27 and 30 is connected to the cathode 31 of the triode tube 32. The triode tube 32 is shown only in Figure 3 and may be a 6AB4 tube, acting as a radio frequency amplifier. The triode 32 has its prongs (not shown) which fit into the openings 18 in the tube base 17. The tube base 17 is riveted at 17*a*, 17*b* and 17*c* (Figures 2, 17 and 18) to the base 20 and is so rigidly fixed thereto. The openings 18 enclose two resilient arms 16 (Figure 2) which seat the prongs of the tube 32 and thus seat the tube 32 rigidly in the base 17. The base 17 also contains a plurality of lugs 15 (Figure 2) which make contact with prongs of tube 32 and with the surrounding circuitry. The lug 15 connected to the prong leading to the cathode 31 is connected to the surface 19 at point 14.

The terminal 24 described above is connected through an impedance transformation capacitor 34 (Figures 3, 17 and 18) to the grid 33 of the triode 32. The capacitor 34 connects through the base 20 to the printed portion 13 (Figures 1, 2 and 18) which is soldered to the lug 15 connected to the prong leading to the grid 33. The impedance transformation capacitor 34 allows the tuning of the antenna inductor 25 with reduced grid capacity loading.

The grid 33 is connected to an automatic gain control unit 35 (not shown) through an isolation resistor 36 (Figures 3, 17 and 18). The circuitry of automatic gain control units is well known in the art and is therefore only indicated by an arrow in Figure 3. The resistor 36 is connected through the board 20 at point 35*a* to the external terminal 35*b* which subsequently connects to the automatic gain control unit 35.

Figure 15:
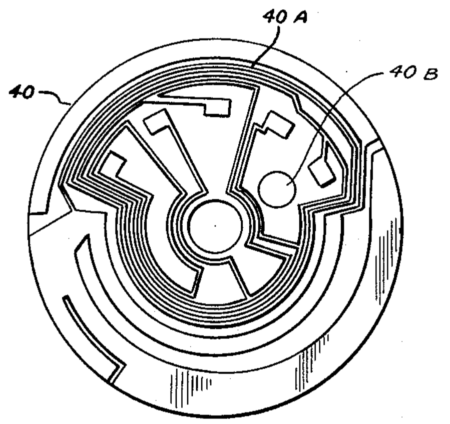
Figure 15 is a top view of a printed tuning inductor of the present invention.
Figure 16:
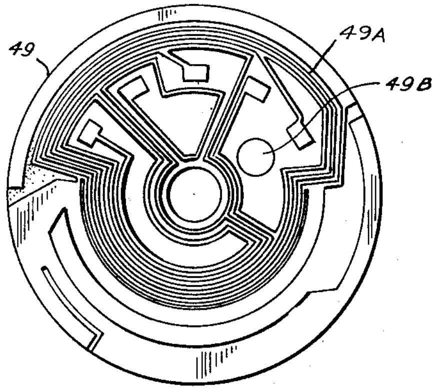
Figure 16 is a top view of a printed tuning inductor of the present invention.

The triode tube 32 is neutralized by means of a split capacitor arrangement in the plate circuit, as is hereinafter described. The plate 37 is connected at 37*a* (Figures 1, 2 and 18) to the board 20 and through a trimmer capacitor 38 (Figures 2, 3 and 18) to ground at surface 19. The capacitor 38 compensates for the difference in capacity of different tubes 32 that may be used and allows tuning of the variable inductor or coil board 40, hereinafter described in reference to Figures 15 and 19, being the tuned plate inductance. The trimmer capacitor is adjusted by a screw 39 shown in Figures 17 and 18.

The plate 17 is connected to the variable inductor 40 through an inductor 41 which is essentially a lumped inductance. Inductor 41 can also be made variable to help compensate for variations in the manufacture of the coil board 40 or for variations in the tube capacities.

The inductor 41 has mounted thereon a leaf spring 197 which makes contact, as is hereinafter described, with the coil board 40. The plate 37, described above, is loaded by means of a load resistor 42 (Figures 3, 17 and 18) connected across coils 40 and 41 and a resistor 57 (Figures 2, 3 and 18) which is connected across the leaf springs 197. The load resistor 42 loads the total plate tuning and has the greater effect on the high channels.

The low channels are tuned by the coil 40 which is composed essentially of low channel coils. This loading procedure tends to give a fairly uniform tuning range on all the channels.

The inductor 40 is connected through the second spring leaf 197 to the neutralizing capacitors 44 and 46. Capacitor 46 returns to the grid 33 of the triode 32, and the capacitor 44 returns to ground at 43, as shown in Figures 2, 3, 17 and 18.

The trimmer capacitor 46 is mounted above the base 17 and is supported by means of the wire leads 46*b* and 46*a*, which are attached to the grounded spring leaf 197 and the cathode lug 15, respectively.

At this point in the plate circuitry the neutralization is constant or practically constant on all channels. The resistor 47 (Figures 3, 17 and 18) connected to point 45 (Figures 1, 2 and 3) is the plate driving resistor and also acts to isolate the circuit from the B+ at the external terminal 48. The external terminals are terminals on the printed circuit board 20 protruding from the chassis and are connected thereto from the outside.

The circuitry associated with the tube 32 as described above is designed to be very compact and of high economy as a great portion of the circuitry printed is on the base 20. The tube 32 is a radio frequency amplifier tube which feeds into a converter section simultaneously with the output of an oscillator, as is hereinafter described, to get a fixed intermediate frequency output from the converter.

Figure 19:
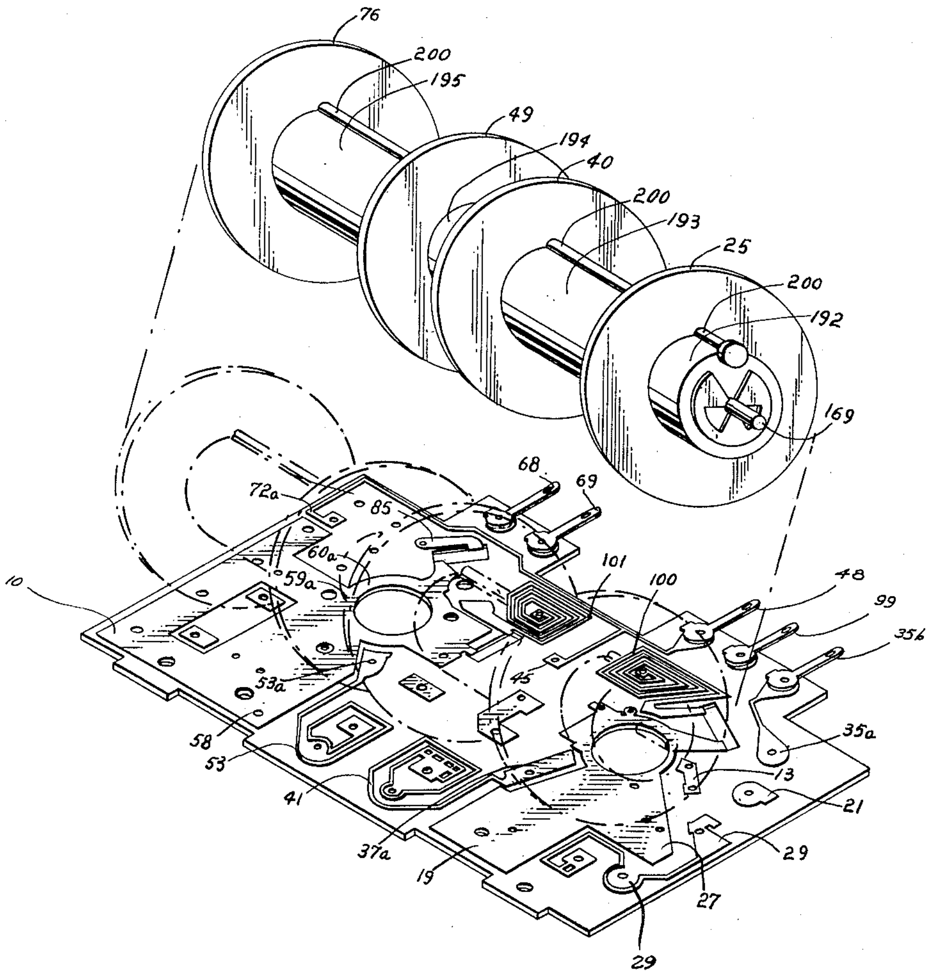
Figure 19 is an exploded view of the printed base and printed coils of the present invention.

The output from the tube 32 is coupled through the inductor 40 as is hereinafter described in reference to Figure 19 to an inductor 49 (Figures 3, 11, 16 and 19). The inductor 49 is a printed coil board somewhat similar in construction as the inductors 40 and 25 and is connected through a printed inductor 53 (Figures 1, 2, 3, 18 and 19) to the grid 52 of a triode 50.

The inductor 53 is essentially a lumped inductance which may be variable and has essentially the same effect as the lump inductance 41 in the plate circuit of the triode 32. The triode 50 in the present modification is part of the double triode 51 (Figure 3).

The double triode 51 is mounted on a base 51*a* which is similar in construction to the base 17 described above.

The tube base 51*a* is rigidly attached to the base 20 by rivets 51*b*, 51*c* and 51*d* (Figure 2) and has opening 51*e* (Figures 2 and 17) to seat the prongs, not shown, of the double triode 51. The prongs are connected through the connecting lugs 11 (Figure 2) to the surrounding circuitry.

The inductor 53, described above, is connected to a lug 11 of the triode 50 at 53*a* (Figures 1, 2, 18 and 19) on the printed board 20. The lug 11 at point 53*a* connects to the grid 52 (Figure 3) of the triode 50.

The triode 50 acts as a converter tube as is hereinafter described.

The grid 52 is connected to ground through the converter grid trimmer capacitor 54 (Figures 2, 3 and 18) which has a range from ½ a micromicrofarad to 3 micromicrofarads. Capacitor 54 is adjusted by means of the adjusting screw 54*a* (Figures 17 and 18). The grid 52 is also connected to a 220,000 ohm grid resistor 55 (Figures 3, 17 and 18) and thence to ground at 58 (Figures 2, 3, 18 and 19) on the surface 10, and to the grid coupling capacitor 56 (Figures 3, 17 and 18). The grid coupling capacitor 56 has only 20 micromicrofarads capacitance in order to permit tuning with the printed coils, hereinafter described. The grid 52 of the triode 50 returns then to point 58 on the printed surface 10 through inductors 53, 49 and capacitor 56.

The cathodes 59 and 60 of the double triode 51 are grounded to point 59*a* and 60*a* which is also on the sheet of copper 10 on the printed board 20. The plate 61 of the converter 50 of the double triode 51 is connected to the parallel combination of a resistor 62 and inductor 63, (Figures 2, 3 and 18). The inductor 63 is physically a long lead which is wound on the resistor 62 so as to conserve space. The resistor 62 and inductor 63 combination has been found to give optimum results with regard to the grid loading at grid 52 on the high channels. The Q of the inductor 63 is thus lowered by the resistor 62 and results in a flattened frequency response. The inductor 63 and resistor 62 are connected to the output intermediate frequency coil 64 (Figures 2, 3 and 18) which is grounded at both ends through the capacitors 65 and 66 respectively (Figures 2, 3 and 18). The capacitor 65 in conjunction with the capacitor 66 tunes the coil 64 to approximately 20 megacycles. To increase the tuning range inductor 64 is provided with an iron core indicated at 100*a* in Figure 3.

The coil 64 is coupled to a coupling loop 67 (Figures 3 and 18) which enables the output of the tuner to be coupled to the rest of the television set. The coupling loop 67 is connected to two external terminals 68 and 69 as seen in Figures 2, 17, 18 and 19, which protrude from the outside of the printed board 20 and are connected through the lines 92 and 93 (Figure 17). The coupling loop 67 couples to the first intermediate frequency tube, not shown. Enough coupling has been provided from inductor 64 by coil 67 to provide adequate coupling to the first intermediate frequency stage of the television set. The coil 67 has five turns wound on the coil 64, which is constructed of twenty-five turns of #40 wire. Link type coupling is provided to reduce oscillator radiation.

The converter tube 50 is neutralized to reduce the amount of reflection of the intermediate frequency in the radio frequency pattern by providing a neutralizing capacitor 71. The neutralizing capacitor 71 has 2½ micromicrofarads capacity and is coupled to the grid 52 of the converter tube 50. The output coil 64 is connected to the converter plate load resistor 72 (Figures 3, 17 and 18) which is a 4700 ohm resistor. The resistor 72 is connected to the resistor 47 described above by the printed lead 72*a* (Figures 1, 2, 18 and 19) and does not load the neutralizing arrangement as described above, since the neutralizing voltage is taken from point 73 (Figures 1, 2 and 18) where the 20 micromicrofarad tubular capacitor 66 connects to ground. This construction is another split capacitory type of neutralization as described above and is not critical due to the single frequency operation at 20 megacycles, which is the frequency of the output.

Figure 9:
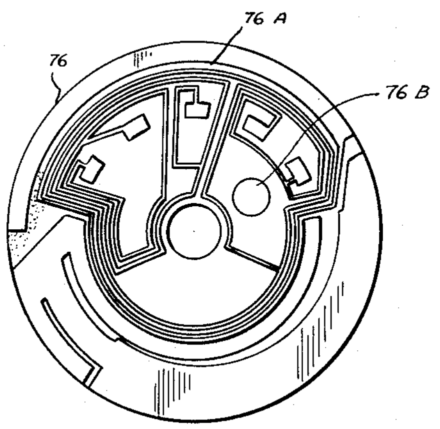
Figure 9 is a top view of a printed tuning inductor of the present invention.

The oscillator section is associated with the triode 74 of the double triode 51 and contains a parallel combination of inductors 75 (Figures 2, 3 and 18) and 76 (Figures 3, 9 and 11), which is connected to the grid 81 of the triode section 74 through a capacitor 82 (Figures 3, 17 and 18). This parallel combination of the inductance 75 and 76 is essentially the tuning inductance which determines the frequency at which the oscillator operates. The inductance 76 is the tunable inductance or the coil board inductor which is connected to a shaft and turned with the other coil board inductors, as is hereinafter described. By varying the inductance 75 by means of the screw 75*a* (Figures 17 and 18) it is possible to vary the oscillator frequency without moving the variable inductor 76. This provision is necessary as the printed coil 76 is fixed on the shaft with the other printed coil boards 25, 40 and 49, described above.

Two other adjustments have been provided which can be made at the factory. The two adjustments consist of the variable inductor 77 (Figures 2, 3 and 18) and the variable capacitor 79 (Figures 2, 3 and 18). The variable inductor 77 is a small lump inductance which is connected in series to the parallel combination of the inductances 75 and 76 and is adjusted by means of the screw 77*a* (Figures 17 and 18). The other end of the inductor 77 is connected to the trimmer capacitor 78 which is adjusted by means of the screw 79*a* (Figures 17 and 18) and thence to ground on base 10. The trimmer capacitor 78 compensates for variations in the rated capacity and the inductor 77 compensates for inductance variation on the high channels. These three means of adjusting the oscillator frequency are provided to give proper tracking of the oscillator on all channels. The inductance 77 effects only the high channel tuning and has no effect on the low channels due to its relatively small value.

Figures 4, 5, 6, 7, 10, 12:
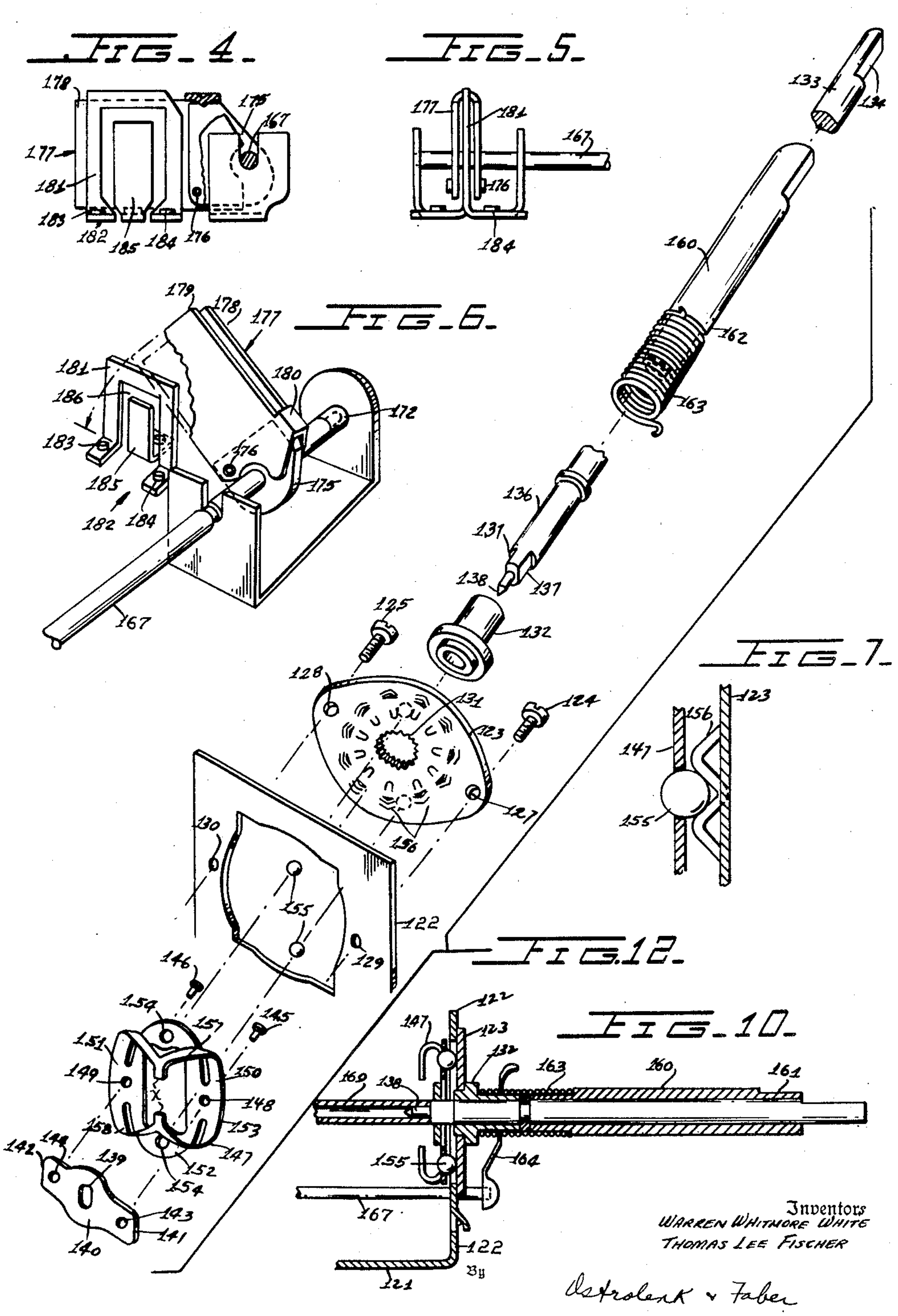
Figure 4 is a side view of the fine tuning element of the present invention.
Figure 5 is a side view of the unit of Figure 4.
Figure 6 is a perspective view of the fine tuning element of the present invention.
Figure 7 is a sectional view of a portion of the stepping mechanism of the present invention.
Figure 10 is a sectional view of the driving elements of the invention.
Figure 12 is an exploded view of the driving element.

The fine tuning is accomplished by fine tuning element 80 (Figures 2 and 18) which is hereinafter described in detail with reference to Figures 5, 6 and 7, connected from the plate 88 of the tube 74 to the trimmer capacitor 78. The lug 11 from the plate 88 is shown in Figure 2 as 11*a*.

The grid 81 is connected through a conventional grid leak resistor 84 (Figures 2, 3 and 18) to ground at 85 (Figures 1, 2, 18 and 19) and through capacitor 82, described above, and capacitor 86 (Figures 3, 17 and 18) to ground at 87 (Figures 1 and 2). The injection to the converter 50 from the oscillator 74 is accomplished by means of the capacitor 89 (Figures 2, 3 and 18) which connects the grids 52 and 81. The capacitor 89 has two microfarads capacity and in conjunction with the circuitry arrangement of the oscillator provides a constant injection voltage to the converter section 50.

B+ from terminal 48, described above, is supplied to the oscillator through the resistor 91 (Figures 3, 17 and 18).

The filaments 97 and 98 (Figure 3) of the tubes 32 and 51, respectively, receive a 6.3 volt supply through terminal 99 (Figures 1, 2, 3, 18 and 19). Terminal 99 is connected through printer inductor 100 (Figures 1, 2, 18 and 19) to filament 97 and through an inductor 101 to filament 98 and simultaneously through tubular capacitors 102 and 103, respectively, to ground.

The tubular condensers 102 and 103 are fitted into slots 102A and 103A (Figures 1 and 18) in the base 20, to form a compact and strong structure.

As described above and as shown specifically in Figures 11 and 19, the low channel coupling between the radio frequency tube 32 and the converter triode 50 is accomplished by means of the relative positions of the inductors 40 and 49. The field of the inductor 40 crosses the inductor 49 and thus accomplishes inductive coupling on the low channels. The coupling remains approximately constant on each of the low channels at a value in the neighborhood of 4½ megacycles. The mutual inductance of the inductors 40 and 49 is not effective on the high channels due to the coil construction.

The coupling on the high channels is accomplished by the relative positioning and direction of current flow in the printed circuit of the lump inductances 41 and 53 os as to be essentially inductive coupled. The inductors 41 and 53 are positioned parallel to each other on printed board circuit 20, and as shown more specifically in Figure 19, are formed in position so as to be predominantly inductive coupled, i. e., with a minimum of capacitive coupling. The coupling on the high channels is nearly constant having a flat response over approximately 4½ megacycles for each channel.

One of the important features of the printed circuit tuner described above is that the oscillator converter tube 51 and associated circuitry of the tuner has a ground plate 10 on the printed board 20 to which all of the circuit grounds are made. This in turn is grounded to the metal chassis 121 hereinafter described at one point only. Similarly, the ground plate 19 printed on the printed board 20 has connected to it all of the circuit grounds for the radio frequency or amplifier section of the tuner which in turn is grounded to the metal chassis 121, hereinafter described, at another point near the antenna input. These features reduce oscillator radiation since there is less chance for a circulating current in ground plate 19 or chassis 121 to cause energy from the oscillator to be inducted into the radio frequency section of the tuner. There is no physical connection on the printed plate 20 itself between the two ground plates 10 and 19, the one in the oscillator converter and the other in the amplifier.

If such a current would flow in the chassis between various grounds of the radio frequency section and the oscillator section it would very likely lead to excessive oscillator energy being transmitted through the radio frequency section and into the antenna.

Figure 11:
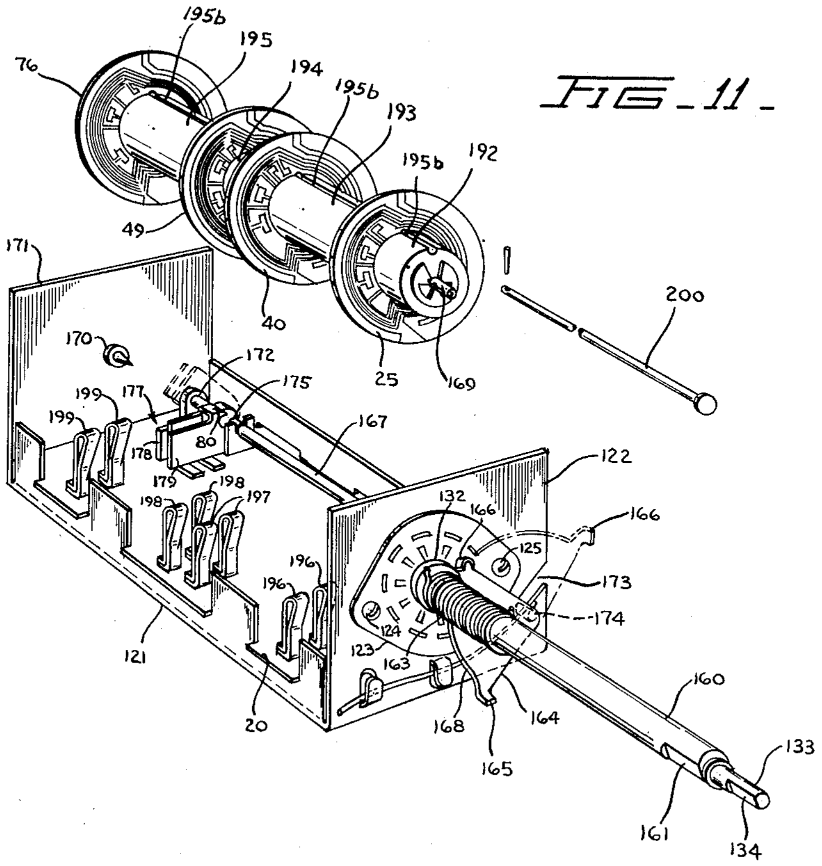
Figure 11 is a partially exploded view of the chassis and driving elements.

Referring now to Figure 11, the chassis 121 has a front panel 122 and supports the base 20, described above. The front panel 122 supports the notched member 123 by means of two screws 124 and 125 over the opening 126. The screws 124 and 125 fit through the holes 127 and 128 in the notched member 123 and thread the holes 129 and 130 in the front panel 122. The notched member 123 has a centrally located multi-toothed opening 131, which opening 131 seats a brass bushing 132, shown also in Figure 12.

The bushing 132 rotatably supports a shaft 133, which is the rough tuning or channel selector shaft. The shaft 133 has a milled portion 134 which supports a knob, not shown, and a hollow fine tuning shaft 160, hereinafter described.

The end 136 of the shaft 133 has two diametrically opposed milled faces 137 and a pin 138 as an integral part thereof. The end 136 protrudes from the bushing 132 and fits into the opening 139 of crank member 140. The crank member 140 has diametrically opposed arms 141 and 142 having the holes 143 and 144, respectively.

The crank member 140 is riveted by means of rivets 145 and 146 through openings 143 and 144 to a resilient rotatable member 147. The resilient member 147 bears the rivets 145 and 146 in openings 148 and 149, respectively.

The openings 148 and 149 are located in the sections 150 and 151 which join the two units 152 and 153 of the resilient member 147. The unit 152 is elliptically shaped and has two diametrically opposed openings 154. The openings 154 seat ball bearings 155 against the notched member 123. The diameter of the opening 154 is slightly smaller than the diameter of the bearings 155. The bearings 155 are seated between the rounded notches 156, shown more particularly in Figure 7.

The rotation of shaft 133 causes the crank 140 bearing resilient member 147 to rotate. The rotation of the resilient member 147 causes the bearings 155 to ride over the notches 156 to a subsequent position between two other notches 156.

The other unit 153 of resilient member 147 is also elliptically shaped and is bent at 157 and 158 to resiliently support a disk 159, hereinafter described, shown in Figure 11.

The spring member 147 provides a symmetrically balanced detent mechanism in which the required spring force or tension is evenly divided and so eliminates any side thrust or distortion of the main driving shaft.

The spring member 147 also provides the thrust force which force is required to hold the tunable element of coil boards 25, 40, 49 and 76 against the pivot point 170, hereinafter described. The member 147 has a third function by providing the turning force or torque required to turn the movable tuning elements. This action is accomplished through the two fingers or protrusions X (Figure 12). The fingers X provide spring tension in the direction of the main drive shaft 169 being supported by the two bent supporting portions 157 and 158 of the spring member 147.

The advantages of this type of construction is that one unit or stamping for the part 147 essentially serves as two or three more separate springs, levers or members necessary to accomplish the functions of positioning the tuning element in the chassis, of providing the turning moment for the tuning element, and of providing for adequately detenting or stopping the tuning element in accurately controlled position or positions.

The main tuning element or drum consisting of the printed coils is supported between pivots 170 and 138 and the driving moment is provided by the two points X of the spring 147.

Any slight misalignment of the sometimes long tuning shaft 161 will not throw any distortion or strain on the main tuning assembly. The distortion or strain is taken up by the spring action of member 147 which the fingers X then move in the corresponding slots 159a and 195a in member 192, hereinafter described.

The shaft 133 described above supports a hollow shaft 160. The hollow shaft 160 is milled at one end 161 to support a knob, not shown.

At the other end 162 of the hollow shaft 160 is rigidly attached a coil spring 163. The spring 163 may be fixed to the shaft 160 by brazing or by tight threading or by any other means known in the art. The spring 163 is in frictional relationship with a resilient member 164. The resilient member 164 is shaped as the sector of a circle and has two extensions 165 and 166. The member 164 is rigidly supported on a shaft 167 either by a welded connection or otherwise.

The rotation of the hollow shaft 160 causes the rotation of the resilient shaped member 164 and thus the shaft 167.

The contact between the spring 163 and the resilient member 164 is a high frictional one. The resilient member 164 is deformed against the spring 163. The contacting arcuate edge 168 of the member 164 bears tangentially against two surfaces of the spring 163 as it fits into the space between the coils of the spring 163. The construction results in a substantially positive drive with no slippage.

The extensions 165 and 166 come into contact with the spring 163 and prevent further rotation of the resilient member 164. Further rotation of the hollow shaft 160 causes slippage between the resilient member 164 and the coil spring 163.

The shaft 167 performs the fine tuning in a manner hereinafter described.

The pin 138 helps support a partially hollow shaft 169. The shaft 169 is suspended between one support, the pin 138 on the front panel 128 and upon a bearing pin 170, as shown in Figure 11, on a back panel 171. The shaft 169 has firmly attached to the front thereof, as is hereinafter described, a cylindrical member 192. The member 192 is removably attached to the resilient member 147 at points X, described above, so that upon rotation of the shaft 133, the crank 140, the resilient member 147, the member 192 and the shaft 169 all rotate together. The shaft 169 also carries four tuning inductors or printed coils 25, 40, 49 and 76, described above and shown in Figures 14, 15, 16 and 9, respectively. The tuning inductors 25, 40, 49 and 76 bear against spring contacts 196, 197, 198 and 199, as shown in Figures 2, 11 and 18, and have conductive paths 25a, 40a, 49a and 76a, respectively.

The printed coils 25, 40, 49 and 76 are each essentially a number of individual coils in series or one complete series coil in which taps are taken off at the exact inductive position necessary for each of the 12 television channels or frequencies.

The success of these coils lies entirely in the geometric configuration which is so arranged that the normal position of each tap is taken off having the inductance at the proper value for the consecutive television station or frequency. Any change in the configuration of the coil or overall size of the coil will therefore throw the inductance out of range of the particular television frequency.

A further advantage of this type of construction in which the coil rotates and in which all coils in this configuration are in series is that this construction eliminates all necessity of further soldered connections or joints or the necessity of adding any external inductance. In other words, after the coil is etched, fabricated and punched out there are no further soldering operations or any further electrical connections to be made to the coil. The inductance is complete as etched and only requires for operation that contact be made to it by the spring clips 196—199 described above.

The rotation of shaft 133 as described above by means of a knob, not shown, causes the tuning inductors 25, 40, 49 and 76 to rotate, changing the tuned frequency to which the set is tuned.

The coil boards 25, 40, 49 and 76 are rigidly fixed in position by the plastic bushings 192—195, and 195a, which slide on the shaft 169; 195a being behind the disc 76 and thus not shown. The bushings 192—195 and 195a each have a longitudinal groove 195b through which a plastic rod 200 fits. The rod 200 passes through the holes *25b*, *40b*, *49b* and *76b* of the inductors 25, 40, 49 and 76, maintaining them rigidly in position.

The shaft 167, as shown in Figure 11, and more particularly in Figures 4, 5 and 6, carries a variable condenser unit, hereinafter described. The shaft 167 is positioned on the back panel by means of a hole 172 and on the front panel 126 by means of a slot 173, having a groove 174 which fits into the slot 173. The shaft 167 has rigidly attached thereto a partially circular dielectric member 175. The partially circular dielectric member 175 has rigidly thereto by means of a rivet 176 a plate assembly 177. The plate assembly 177 is thus insulated from the shaft 167. This insulation is provided to eliminate sliding contacts wherever possible since sliding metallic contacts contribute appreciably to the noise during the operation of a fine tuner.

Another reason for insulating the plate assembly 177 is to reduce the amount of coupling of oscillator energy to the shaft 167.

The plate assembly 177 comprises two metallic plates 178 and 179 which are connected by means of a connection 180, all of which are integral parts of the plate assembly 177.

Figure 13:
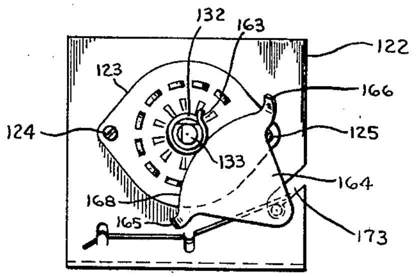
Figure 13 is a front view of the chassis.

The rotation of shaft 167 by means described above in reference to Figures 11, 12 and 13 causes the dielectric member 175 and the plate assembly 177 to rotate. The rotation of the plate assembly 177 causes the plate assembly 177 to rotate over a U-shaped conductor 181 which is rigidly attached to the base 182 by means of two rivets 183 and 184. The plate assembly 177 also rotates over a substantially rectangular member 185 which is seated centrally in the opening of the U-shaped member 181.

The rectangular plate 185 lies substantially in the same plane as the space 186 which is between the two plates 178 and 179 and also in the same plane as the U-shaped member 181. The U-shaped member 181 and the rectangular plate 185 are essentially of the same thickness and preferably of the same conducting material having approximately a 1/16 of an inch rectangular gap between the rectangular member 185 and the U-shaped member 181. The central rectangular plate 185 is connected to the base 182 of the tuner. The rotation, then, of the plate assembly 177 increases the capacity between the U-shaped member 181 and the rectangular member 185. The increasing capacity is due to two series capacitors, one from the U-shaped member 181 to the plates 178 and 179 and the other from the movable plates 178 and 179 to the rectangular plate 185.

The reason for the above construction is to provide an approximately equal fine tuning range on the high frequency channels as well as the low frequency channels. Since the high frequency band is approximately two to three times the frequency of the low frequency band, the percentage change of frequency when capacitance change alone is used for fine tuning is substantially constant. Thus an equal rotation of the fine tuning knob will now cause a greater variation in frequency at the upper band channel frequencies than at the lower band channel frequencies.

Figure 8:
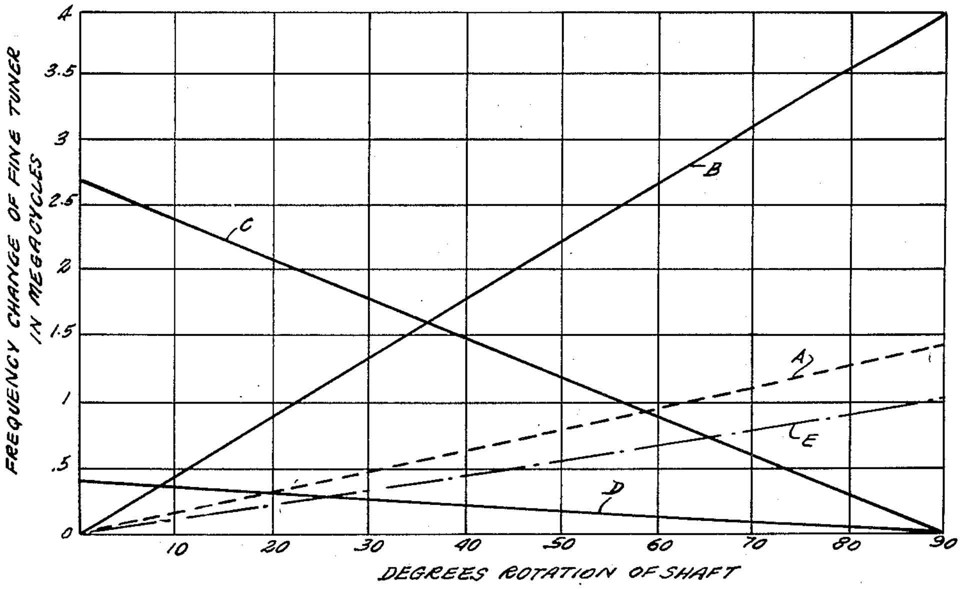
Figure 8 is a series of reactance vs. shaft rotation curves.

When operating on the high frequency band, the fine tuning tends to become rougher, giving greater variations and making it harder to tune accurately. The construction as shown in Figures 4, 5 and 6 alleviates this condition by introducing a variation in inductive reactance in the U-shaped member 181 due to eddy currents. The variation in inductive reactance on the low channels as illustrated in Figure 8 on the curve marked D is practically negligible as the shaft is rotated. The variation in inductive effect, however, on the high channels as illustrated by the curve marked C is substantial and the frequency change produced by this variation is correspondingly large. This frequency change produced by variation in inductive reactance is in opposition to the frequency change produced by the simultaneous change in capacitance.

The tuning range on the low channels is shown by the dashed curve A. Curve A is the approximate curve which is the desirable tuning range on the high channels. The tuning range of the capacitor alone on the high channels is illustrated by the curve B. Combining the effects of curve B, the tuning range of the capacitor alone on the high channels, together with the inductive effect on the high channels, curve C produces a resultant tuning range on the high channels as illustrated by curve E. Thus if the high frequency was, say three times as great as the low frequency, an equivalent inductive reactance, which would be approximately two-thirds the capacitive reactance, would be introduced at this high frequency, leaving an equivalent capacity of one-third the capacitor resulting in a tuning range which is substantially the same as on the low frequency. The result of this construction is a fine tuning means which gives substantially the same tuning frequency range on the high band channels as on the low band channels.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

We claim:

1. In a tuning device for selectively tuning a group of channels in a relatively high frequency band and a group of channels in a relatively low frequency band comprising a radio frequency amplifier stage and a converter oscillator stage; said amplifier stage having a first and a second output inductor; said converter oscillator stage having a first and a second input inductor; said first output inductor and said first input inductor being stationarily connected in said tuning device and coupling the said two stages at the said high frequency band; said second output inductor and said second input inductor coupling the said two stages at the said low frequency band.

2. In a tuning device for selectively tuning a group of channels in a relatively high frequency band and a group of channels in a relatively low frequency band comprising a radio frequency amplifier stage and a converter oscillator stage; said amplifier stage having a first and a second output inductor; said converter oscillator stage having a first and a second input inductor; said first output inductor and said first input inductor being stationarily connected in said tuning device and coupling the said two stages at the said high frequency band; said second output inductor and said second input inductor coupling the said two stages at the said low frequency band; a base plate for mounting the said two stages; the said first inductors being printed on said base plate; a plurality of discs rotatable with respect to said base plate; each of said second inductors being printed on one of said discs; means for coupling said second inductors on said discs to said first inductors on said base plate.

3. In a tuning device for selectively tuning a group of channels in a relatively high frequency band and a group of channels in a relatively low frequency band comprising a radio frequency amplifier stage and a converter oscillator stage, a base plate; said two stages being mounted on said base plate; a plurality of discs rotatable with respect to said base plate; inductances printed on said discs for tuning said two stages to said channels; means coupling the inductances of one of said discs to the output of said amplifier stage; means coupling the inductances of a second disc to the input of said converter oscillator stage; electromagnetic flux linking the inductances on the said two discs and mutually coupling the said two stages at the said low frequency band; an inductor printed on said base plate in the output circuit of said amplifier stage; another inductor printed on said base plate at the input circuit of said converter oscillator stage, said last two printed inductors being fixedly connected in said tuning device; means coupling the said printed base inductors to the said printed disc inductor; electromagnetic flux linking the said printed base inductors and mutually coupling the said two stages at the said high frequency band.

References Cited in the file of this patent

UNITED STATES PATENTS

| | | |
|---|---|---|
| 2,215,775 | Banfield | Sept. 24, 1940 |
| 2,474,988 | Sargrove | July 5, 1949 |
| 2,543,560 | Thias | Feb. 27, 1951 |
| 2,596,117 | Bell et al. | May 13, 1952 |

FOREIGN PATENTS

| | | |
|---|---|---|
| 349,706 | Great Britain | June 4, 1931 |

OTHER REFERENCES

"Low-Noise-Silver-Printed Television Tuner," by Harry Kayner, in Tele-Tech, vol. 10, issue 3, pp. 39–41 and 102, March 1951.

Riders T. V. Manual, vol. 6, Meck, Models MM–510T etc., pp. 6–5.

Printed Circuits Publication 192, by National Bureau of Standards.

Circular 468, National Bureau of Standards.